US006999871B2

(12) United States Patent
Ohno et al.

(10) Patent No.: US 6,999,871 B2
(45) Date of Patent: Feb. 14, 2006

(54) VEHICLE NAVIGATION SYSTEM ADAPTED TO IMPROVED SYSTEM UPGRADE PROCEDURE

(75) Inventors: Tsuneo Ohno, Saitama (JP); Yuuji Kameoka, Saitama (JP); Go Yuasa, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 89 days.

(21) Appl. No.: 10/679,285

(22) Filed: Oct. 7, 2003

(65) Prior Publication Data

US 2004/0083053 A1    Apr. 29, 2004

(30) Foreign Application Priority Data

Oct. 29, 2002  (JP) ............................. 2002-314076
Oct. 29, 2002  (JP) ............................. 2002-314138
Oct. 29, 2002  (JP) ............................. 2002-314202

(51) Int. Cl.
*G06F 12/00*    (2006.01)
(52) U.S. Cl. ..................... 701/200; 701/208; 701/210; 340/995.18; 342/357.13
(58) Field of Classification Search ............... 701/200, 701/208, 210; 340/995.18; 342/357.13; 717/11
See application file for complete search history.

(56) References Cited

U.S. PATENT DOCUMENTS

| | | | | |
|---|---|---|---|---|
| 5,515,284 A | * | 5/1996 | Abe ............................ | 701/202 |
| 5,544,087 A | * | 8/1996 | Nakajima et al. ........... | 701/200 |
| 5,794,164 A | * | 8/1998 | Beckert et al. ............. | 455/3.06 |
| 5,951,620 A | * | 9/1999 | Ahrens et al. ............... | 701/200 |
| 6,018,695 A | * | 1/2000 | Ahrens et al. ............... | 701/200 |
| 6,121,924 A | * | 9/2000 | Meek et al. ............ | 342/357.13 |
| 6,144,318 A | * | 11/2000 | Hayashi et al. ......... | 340/995.19 |
| 6,289,276 B1 | * | 9/2001 | Ahrens et al. ............... | 701/200 |
| 6,292,626 B1 | * | 9/2001 | Ino et al. ..................... | 386/125 |
| 6,600,993 B1 | * | 7/2003 | Kaneko et al. ............. | 701/208 |
| 6,763,429 B1 | * | 7/2004 | Hirayama .................... | 711/112 |
| 2001/0004724 A1 | | 6/2001 | Nagaki | |

FOREIGN PATENT DOCUMENTS

| | | |
|---|---|---|
| JP | 2000-251396 | 9/2000 |
| JP | 2001-133273 | 5/2001 |
| JP | 2001-165671 | 6/2001 |

* cited by examiner

*Primary Examiner*—Thomas G. Black
*Assistant Examiner*—Eric M. Gibson
(74) *Attorney, Agent, or Firm*—Arent Fox PLLC

(57) ABSTRACT

A vehicle navigation system includes a hard disk drive, which stores an old navigation software set; an optical disk drive which is accessible to an optical disk which stores a new navigation software set; a first executing section which drives the hard disk drive; and a second executing section which drives the optical disk drive. An install section responds to a navigation instruction to control the first executing section to drive the hard disk drive such that a vehicle navigation is carried out based on the old navigation software set, when the optical disk is not available. Also, the install section controls the second executing section to drive the optical disk drive such that the vehicle navigation is carried out based on the new navigation software set and the first and second executing sections to drive the hard disk drive and the optical disk drive such that the new navigation software set is installed from the optical disk into the hard disk drive, when the optical disk is available.

33 Claims, 4 Drawing Sheets

VEHICLE NAVIGATION SYSTEM ADAPTED TO IMPROVED SYSTEM UPGRADE PROCEDURE

BACKGROUND OF THE INVENTION

1. Field of the Invention

The present invention is related to a vehicle navigation system, in particular, to a technique for upgrade of a vehicle navigation system.

2. Description of the Related Art

Vehicle navigation systems are provided with storage devices containing navigation software programs and map data. A hard disk drive is a typical storage device used in a vehicle navigation system. A navigation system with a built-in hard disk drive uses a navigation program and map data stored in a hard disk drive to navigate a vehicle to a destination.

Some drawbacks are in the navigation system with such a built-in hard disk drive. For the upgrade of the navigation system with a built-in hard disk drive, the hard disk drive must be detached, the navigation program and the map data stored in the hard disk drive must be upgraded, and the hard disk drive must be attached to the system again. Therefore, one of the drawbacks is in that the navigation system cannot be used during upgrade of the navigation program and the map data. Also, this upgrade procedure undesirably requires the user to hand over the vehicle to a dealer to have the hard disk drive updated.

Therefore, a need exists to provide a technique for effectively shortening the duration for the update.

An optical disk drive, such as a DVD-ROM drive, is another a typical storage device used in a vehicle navigation system. The navigation system with such a built-in DVD-ROM drive uses a navigation program and map data stored in a DVD-ROM to navigate a vehicle to a destination. Upgrading a navigation system with a built-in DVD-ROM drive can be achieved by replacing DVD-ROM to update the navigation program and map data. Therefore, the navigation system with the built-in DVD-ROM drive is superior to that with the built-in hard disk drive in necessary duration for the upgrade. Nevertheless, the DVD-ROM drive is inferior to the hard disk drive in access time, and this undesirably leads to a slow operation speed of the system. Therefore, a navigation system desirably operates using a hard disk drive to improve operation speed.

Navigation systems provided with both a hard disk drive and a DVD-ROM drive are disclosed in Japanese Laid Open Patent Applications No. 2001-133273 and 2001-165671. The disclosed navigation systems transfer map data stored in a DVD-ROM to a hard disk drive, and executes vehicle navigation using the map data transferred to the hard disk drive. These navigation systems allow users to use another DVD-ROM during the vehicle navigation.

Japanese Laid Open Patent Application No. 2000-251396 discloses an in-vehicle information processing unit for achieving reliable data write into a hard disk drive.

SUMMARY OF THE INVENTION

An object of the present invention is to provide a vehicle navigation system, in which the upgrade of navigation programs and map data is carried out in consideration of a state of a vehicle.

Another object of the present invention is to provide a vehicle navigation system, in which the upgrade of navigation programs and map data is automatically restrained.

Another object of the present invention is to provide a vehicle navigation system, in which navigation programs and map data to be upgraded can be selected.

In an aspect of the present invention, a vehicle navigation system includes a hard disk drive, in which an old navigation software set is stored; an optical disk drive which is accessible to an optical disk which stores a new navigation software set; a first executing section which drives the hard disk drive; and a second executing section which drives the optical disk drive. An install section responds to a navigation instruction to control the first executing section to drive the hard disk drive such that a vehicle navigation is carried out based on the old navigation software set, when the optical disk is not available, and to control the second executing section to drive the optical disk drive such that the vehicle navigation is carried out based on the new navigation software set and the first and second executing sections to drive the hard disk drive and the optical disk drive such that the new navigation software set is installed from the optical disk into the hard disk drive, when the optical disk is available.

Here, on completion of the installation, the install section may automatically control the second executing section to stop the operation and the first executing section to drive the hard disk drive such that the vehicle navigation is carried out based on the new navigation software set stored in the hard disk drive.

In this case, the vehicle navigation system may further include: an output unit; and an output control unit which controls the output unit. The install section calculates a data size transferred from the optical disk drive to the hard disk drive, and controls the output control unit such that the output unit outputs the data size. Also, the install section may calculate a remaining time for the installation in addition to the data size, and controls the output control unit such that the output unit outputs the remaining time in addition to the data size.

Also, the install section may control the first and second executing sections to stop the installation of the new navigation software set, when a predetermined vehicle state is detected. In this case, the vehicle navigation system may further include: a plurality of sensors which sense states of the vehicle; and a state analyzing section which analyzes the sensed states of the vehicle and determines whether the vehicle is in the predetermined vehicle state. In this case, the plurality of sensors may be sensors for at least two of a speed and acceleration of the vehicle, a temperature in the vehicle, a battery voltage of the vehicle and a tachometer.

Also, the new navigation software set may contain navigation programs and data, and each of the navigation programs is designated to be specific or not. The install section controls the first and second executing sections to stop the installation of each of the navigation programs and data, when one of the navigation program to be executed is specific, and to carry out the installation of each of the navigation programs and data, when the one navigation program is not specific.

Also, the new navigation software set may contain navigation programs and data, and each of the navigation programs is designated to be restricted or not. The install section controls the first and second executing sections to carry out the installation of each of the navigation programs and data without executing a restricted one of the navigation programs when the restricted navigation program is to be executed during the vehicle navigation. In this case, the vehicle navigation system may further include: an input analyzing section which designates whether each of the navigation programs is restricted, based on an input from a user.

In another aspect of the present invention, a method for upgrading a vehicle navigation system including an optical disk drive which stores a new navigation software set and a hard disk drive which stores an old navigation software set, may be achieved by (a) determining whether an optical disk is available in response to an installation instruction; by (b) carrying out a vehicle navigation based on the old navigation software set, when the optical disk drive is not available; and by (c) installing the new navigation software set from the optical disk drive into the hard disk drive while carrying out the vehicle navigation based on the new navigation software set, when the optical disk drive is available.

Here, the method may further include: automatically switching such that the vehicle navigation is carried out based on the installed new navigation software set on completion of the installation.

The method may further include: calculating a data size transferred from the optical disk drive to the hard disk drive; and displaying the data size. In addition, the method may further include: calculating a remaining time for the installation in addition to the data size; and displaying the remaining time in addition to the data size.

The method may further include: determining whether a vehicle is in a predetermined vehicle state; and stopping the installation of the new navigation software set, when the vehicle is determined to be in the predetermined vehicle state. In this case, the method may further include: sensing states of the vehicle; and determining whether the vehicle is in the predetermined vehicle state, based on the sensed results. Also, at least two of a speed and acceleration of the vehicle, a temperature in the vehicle, a battery voltage of the vehicle and a tachometer may be sensed.

Also, the new navigation software set may contain navigation programs and data, and each of the navigation programs may be designated to be specific or not. The method further includes: stopping the installation of each of the navigation programs and data, when one of the navigation programs to be executed is specific; and carrying out the installation of each of the navigation programs and data, when the one navigation program is not specific.

Also, the new navigation software set may contain navigation programs and data, and each of the navigation programs may be designated to be restricted or not. The method further includes: carrying out the installation of each of the navigation programs and data without executing a restricted one of the navigation programs when the restricted navigation program is to be executed during the vehicle navigation. Also, the method may further include: designating whether each of the navigation programs is restricted, based on an input from a user.

In another aspect of the present invention, a computer-readable software product for the above method for upgrading a vehicle navigation system including an DVD drive which stores a new navigation software set and a hard disk drive which stores an old navigation software set.

DESCRIPTION OF THE PREFERRED EMBODIMENTS

Hereinafter, a navigation system of the present invention will be described in detail with reference to the attached drawings.

Figure 1:
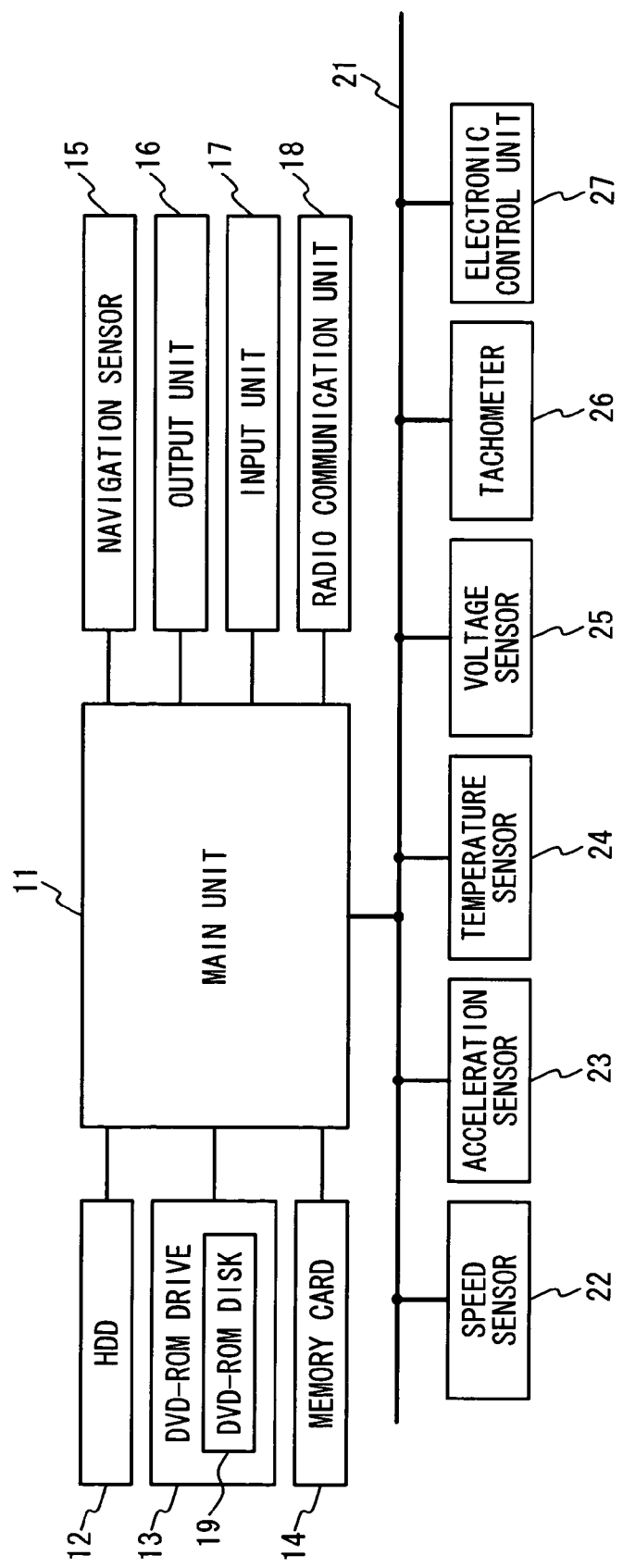
FIG. 1 is a block diagram of a navigation system of the present invention.

As shown in FIG. 1, a navigation system 10 is composed of a main unit 11, a hard disk drive (HDD) 12, an optical disk drive (a DVD-ROM drive in this example) 13, a memory card 14, a navigation sensor 15, an output unit 16, an input unit 17, and a radio communication unit 18. The navigation system 10 is mounted on a vehicle (not shown).

The main unit 11 is an information processing unit (or a computer) provided with a volatile memory unit used for storage of software set, and a central processing unit (CPU) for executing the software. The software set includes computer programs and data used during execution of the computer program.

The hard disk drive 12 is a non-volatile storage unit used for storing the software set. The hard disk drive 12 is responsive to instructions from the main unit 11 to store the software set, and to output and delete the software stored therein.

The optical disk drive (DVD-ROM drive in this example) 13 is responsive to instructions from the main unit 11 to read out software set from an optical disk (a DVD-ROM disk in this example) 19 and to supply the read out software to the main unit 11.

The memory card 14 is used to store software set, and the software set is stored, outputted and deleted in response to instructions from the main unit 11.

The navigation sensor 15 obtains data for determining the position of the vehicle. The navigation sensor 15 may include a GPS antenna and a gyroscope.

The output unit 16 is used to provide various data generated by the main unit 11 for users, including drivers and fellow passengers. The output unit 16 may include a liquid crystal display and a speaker.

The input unit 17 is provided for operation of the users to supply instructions into the main unit 11 of the navigation system. The input unit 17 may include a microphone, a keyboard, and a touch panel.

The radio communication unit 18 is provided to connect the main unit 11 with the Internet through a cellular telecommunication network. The radio communication unit 18 is designed to transfer data received from the main unit 11 to a terminal through the Internet, and to transfer data received from a server through the Internet to the main unit 11.

The main unit 11 is connected to a plurality of electronic control units (ECU) and network sensors through an in-vehicle LAN (local area network) 21. The ECUs are used for controlling various portions of the vehicle. The ECUs may include an engine electronic control unit, a transmission electronic control unit, a power steering system electronic control unit, an ABS (antilock break system) electronic control unit, an air bag electronic control unit, an air conditioner electronic control unit, and a constant speed cruise electronic control unit. The network sensors include a speed sensor 22, an acceleration sensor 23, a temperature sensor 24, a voltage sensor 25, and a tachometer 26. The speed sensor 22 detects the speed of the vehicle. The detected speed is used for the transmission electronic control unit, the power steering system electronic control unit, the ABS electronic control unit, and the constant speed cruise electronic control unit by the main unit 11. The acceleration sensor 23 detects the acceleration of the vehicle. The detected acceleration is provided for the air bag electronic control unit by the main unit 11. The temperature sensor 24 detects the temperature in the vehicle. The detected temperature is provided for the air conditioner electronic control unit by the main unit 11. The voltage sensor 25 detects the output voltage of a battery of the vehicle. The tachometer 26 detects the rotation speed of the engine of the vehicle. The detected rotation speed is provided for the engine electronic control unit by the main unit 11.

Figure 2:
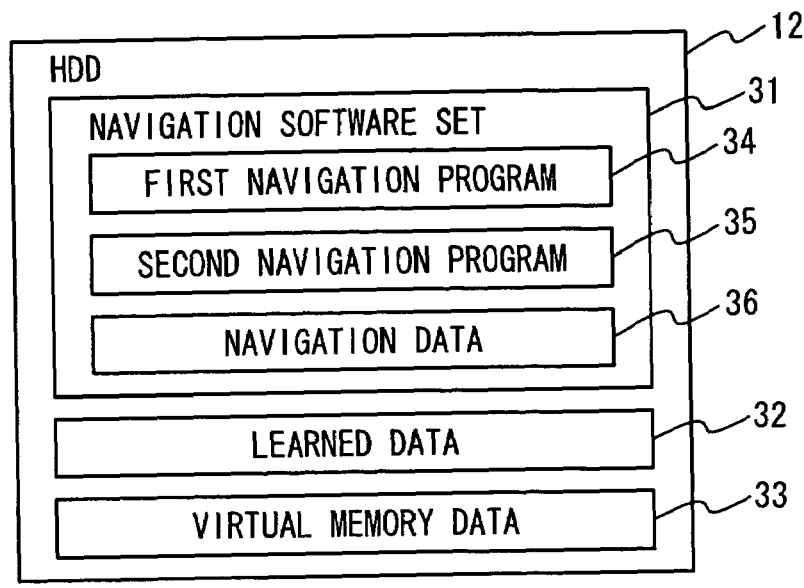
FIG. 2 is a block diagram schematically showing data stored in a hard disk drive in the present invention.

FIG. 2 shows data stored in the hard disk drive 12. The data within the hard disk drive 12 is composed of a navigation software set 31, a learned data 32, and a virtual memory data 33. The navigation software set 31 is a set of computer programs and used for vehicle navigation. The navigation software set 31 allows the navigation system 10 to measure the position of the vehicle, to specify a road along which the vehicle is travelling, to determine a proposed route along which the vehicle reaches the destination, and to inform the users of the proposed route. The learned data 32 is generated by the navigation software set 31, and includes data on past destinations, user-specific data and other data. The virtual memory data 33 is used for a virtual memory technique. An operating system installed in the main unit 11 develops the virtual memory data 33 on the hard disk drive 12 to achieve a virtual memory operation.

The navigation software set 31 includes a first navigation program 34, a second navigation program 35, and navigation data 36. The first navigation program 34 is repeatedly or periodically executed by the main unit 11. The first navigation program 34 includes a computer program designed to determine the position of the vehicle, to specify the road along which the vehicle is travelling, and to inform the users of the specified road by the output unit 16. The second navigation program 35 is executed in response to any of predetermined events. The second navigation program 35 includes a computer program designed to plan a route of the vehicle in response to input of a destination by the user, to re-plan the route of the vehicle in response to the vehicle getting out of the planned route, to provide the users with a guidance of a correct direction in response to the vehicle approaching an intersection, and to execute voice recognition of a spoken instruction provided by a user to operate in accordance with the spoken instruction. The navigation data 36 is used by the first and second navigation programs 34 and 35, and includes map data representative of arrangement of roads. The map data is accompanied by information about the state of the roads, including asphalt-paved roads, dirt roads, and wavy paved roads. The navigation data 36 further includes data used for voice recognition, and data used for achieving a 3D display of the proposed route.

The DVD-ROM disk 19 is used for installing an updated version of the navigation software set 31. The updated version includes first and second navigation programs and navigation data for the navigation software set 31. The first navigation program stored in the DVD-ROM disk 19 is an updated version of the first navigation program 34, which is repeatedly or periodically executed. The second navigation program stored in the DVD-ROM disk 19 is an updated version of the second navigation program 34, which is executed in response to any of the predetermined events. The navigation data stored in the DVD-ROM disk 19 is an updated version of the navigation data 36. The updated navigation data within the DVD-ROM disk 19 is adapted to the updated first and second navigation programs.

Figure 3:
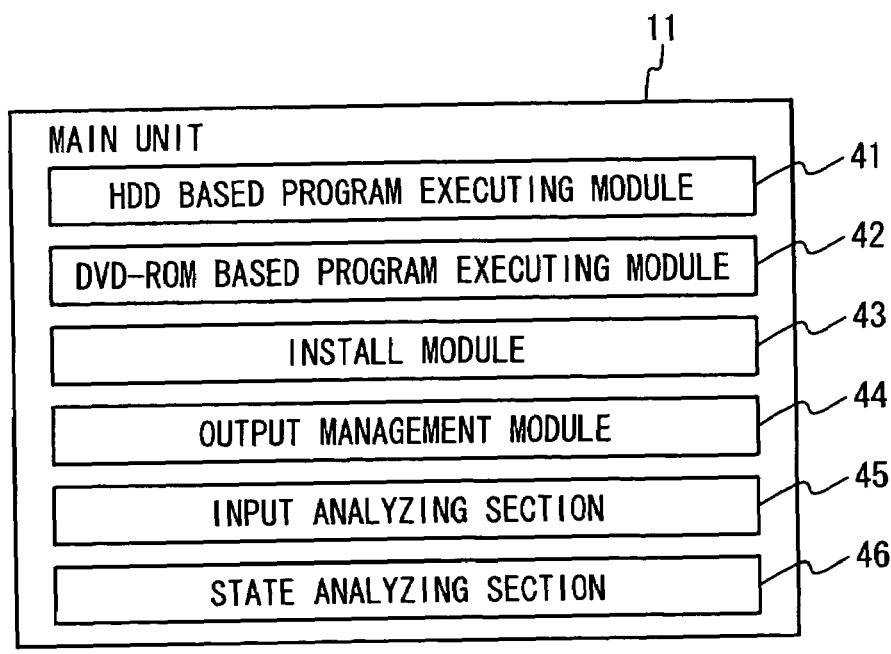
FIG. 3 is a block diagram of a main unit of the navigation system of the present invention.

FIG. 3 shows details of the main unit 11 of the navigation system 10. The main unit 11 includes a HDD based program executing module 41, a DVD-ROM based program executing module 42, an install module 43, a display management module 44, an input analyzing section 45 and a state analyzing section 46. These modules are computer programs stored in a non-volatile memory disposed in the main unit 11.

The HDD based program executing module 41 loads the navigation software set from the hard disk drive 12 and starts the vehicle navigation using the navigation data 36 in response to an instruction from the user through the input unit 17 and outputs a result to the output unit 16 through the output management module 44. A current position data of the vehicle from the navigation sensor 15 is held in the main unit 11 in addition to a replica of a part of the navigation data 36. The HDD based program executing module 41 updates the current position data during the vehicle navigation.

The DVD-ROM based program executing module 42 loads the navigation software set from the hard disk drive 12 and starts any one of software programs stored in the DVD-ROM disk 19 using the navigation data stored therein in response to an instruction from the user through the input unit 17 and outputs a result to the output unit 16 through the output management module 44. The DVD-ROM based program executing module 42 updates the current position data during the vehicle navigation. Thus, the replica of the part of the navigation data 36 are shared by the HDD based program executing module 41 and the DVD-ROM based program executing module 42 for the vehicle navigation, and the switching from the DVD-ROM based program executing module 42 to the HDD based program executing module 41 can be made always without any problem.

The install module 43 drives the HDD based program executing module 41 and the DVD-ROM based program executing module 42 to transfer the navigation software set 31 stored in the DVD-ROM disk 19 to the hard disk drive 12 for update of the navigation software set stored in the hard disk drive 12. The install module 43 is allowed to be executed during execution of the DVD-ROM based program executing module 42.

The output management module 44 is used for providing users with various data such as the update of the software and a navigation state. Specifically, in the update of the navigation program set, the output management module 44 calculates a current ratio of the data size of the already transferred portion of the software to the data size of the whole of the software to be transferred, and a necessary duration time for completing the transfer of the remainder of the software. The output management module 44 controls the output unit 16 to display the calculated ratio and the calculated duration time.

The input analyzing section 45 analyzes inputs from the input unit 17, the navigation sensor 15, the radio communication unit 18, the sensors 22 to 25, the tachometer 26 and the electronic control unit 27 and instructs to control the other modules. Also, the input analyzing section 45 stores data necessary for the vehicle navigation in the navigation data 36 of the hard disk drive 12.

The state analyzing section 46 receives the current states from the sensors connected with the LAN 21, analyzes the current states, and controls the other modules based on the analyzed states.

The operation of the navigation system 10 involves the navigation of the vehicle to the destination and the installation of the updated navigation software set. The vehicle navigation is achieved based on the navigation software set 31 stored in the hard disk drive 12, without using the DVD-ROM drive 13. During navigation on the basis of the hard disk drive 12, the users are allowed to mount an audio or video DVD-ROM disk on the DVD-ROM drive 13 for replay of data stored in the disk.

Figure 4:
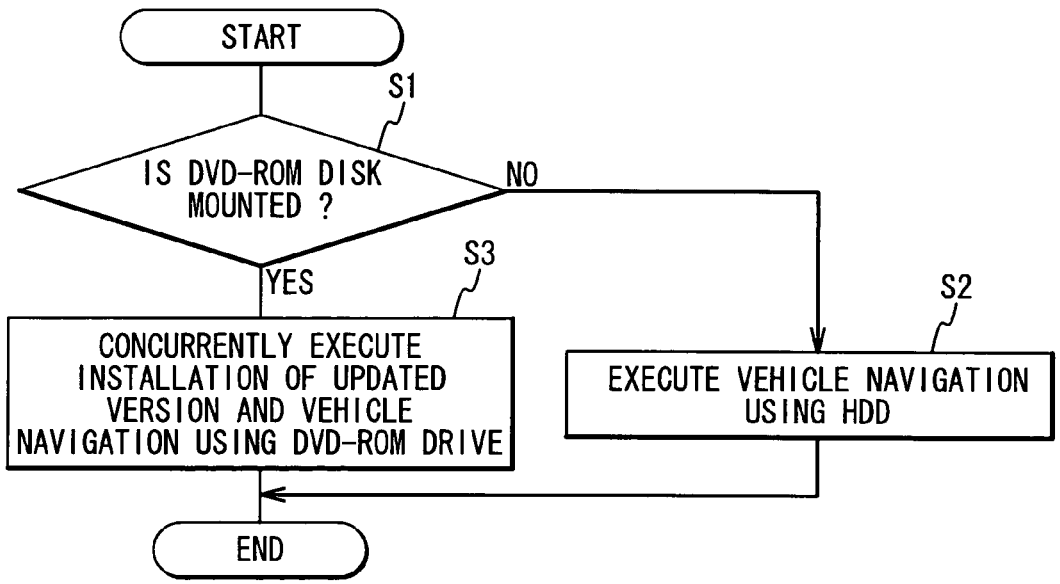
FIG. 4 is a flowchart showing a navigation system update procedure in the present invention.

FIG. 4 is a flowchart of the upgrade of the navigation system 10. To upgrade the navigation system 10, the user is requested to purchase a DVD-ROM 19 storing therein the updated version of the navigation software set 31. In response to the purchased DVD-ROM 19 being mounted on the DVD-ROM drive 13, at a step S1, the install module 43 determines whether the installation of the updated version is allowed. For example, the install module 43 determines whether the user operated the input unit 17 to start the installation, and whether the DVD-ROM 19 storing the updated version is mounted on the DVD-ROM drive 13, i.e., whether the DVD-ROM is available.

When the main unit 11 determines at the step S1 that the installation of the updated version is not allowed, the install module 43 of the main unit 11 quits the installation, and allows the HDD based program executing module 41 to start vehicle navigation using the navigation software set 31 stored in the hard disk drive 12 at a step S2.

Otherwise, the install module 43 of the main unit 11 issues instructions to the HDD based program executing module 41 and the DVD-ROM based program executing module 42 to concurrently execute the installation and the vehicle navigation at a step S3. That is, the install module 43 allows the DVD-ROM based program executing module 42 to read out the updated navigation software set 31 from the DVD-ROM disk 19 to transfer to the hard disk drive 12, and the HDD based program executing module 41 to store the updated navigation software set 31 in the hard disk drive 12, while allowing the DVD-ROM based program executing module 42 to execute vehicle navigation using the updated navigation software set stored in the DVD-ROM disk 19.

The install module 43 may control the DVD-ROM based program executing module 42 to transfer the updated navigation software during idle periods of the vehicle navigation. The updated navigation software is desirably transferred in units of data blocks, each having a predetermined data size. The data block may be consists of a plurality of sectors of the DVD-ROM disk 19. The install module 43 may calculate the size of transferred data and control the output management module 44 to display the remaining time of the installation and/or the size of transferred data. In an alternative example, the install module 43 may control the DVD-ROM based program executing module 42 to execute the installation and the vehicle navigation through time-shared operations. After the completion of the installation of the updated version, the install module 43 controls the output management module 44 that controls the output unit 16 outputs data indicating of the completion of installation to the use. Also, on the completion of the installation, the install module 43 automatically controls the DVD-ROM based program executing module 42 to stop the vehicle navigation operation and the HDD based program executing module 41 to execute the vehicle navigation operation based on the updated navigation program set 31.

This installation procedure effectively shortens the duration when the navigation system 10 is forced to quit vehicle navigation during the upgrade of the system. Conventionally, the upgrade of a navigation system with a built-in hard disk drive involves detaching the hard disk drive and installing updated software into the detached hard disk drive; otherwise the upgrade of the navigation system involves quitting vehicle navigation and installing the updated software into the hard disk drive through the DVD-ROM drive. This results in that the conventional navigation system suffers from a drawback that the conventional navigation system cannot execute vehicle navigation during the upgrade the system. On the other hand, the navigation system 10 of the present invention concurrently executes the vehicle navigation on the basis of the updated version of the software set stored in the DVD-ROM disk during the installation of the updated version. This effectively reduces duration when the navigation system 10 is forced to quit vehicle navigation during upgrade of the system.

In addition, the navigation system 10 is superior in the operation speed. As mentioned above, the navigation system 10 uses the navigation software set stored the hard disk drive 12 during normal operations. The fast access speed of the hard disk drive 12 effectively improves the operation speed of the navigation system 10.

Next, the operation of the navigation system according to the first embodiment of the present invention will be described with reference to FIG. 5.

Figure 5:
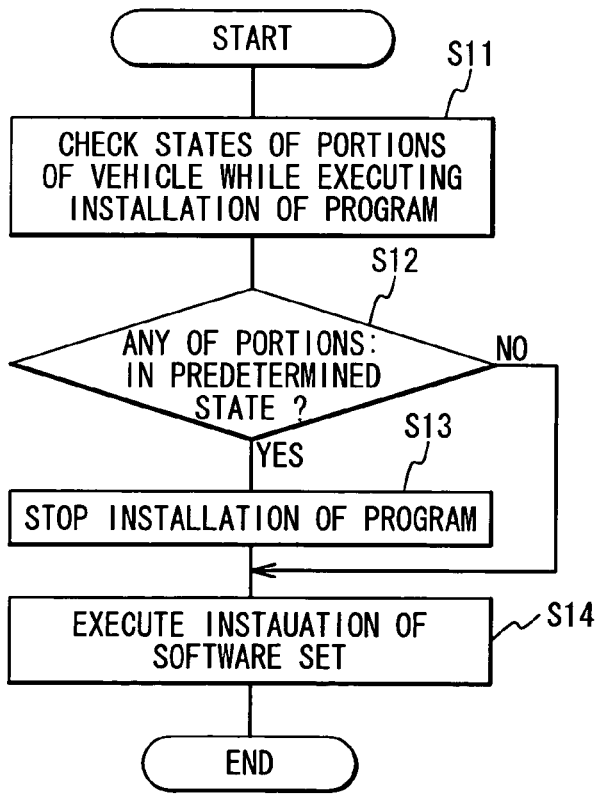
FIG. 5 is a flowchart showing the detail of the navigation system update procedure in the navigation system according to a first embodiment of the present invention.

The flow shown in FIG. 5 is executed during the step S3. More particularly, the state analyzing section 45 detects the states of the vehicle based on the sensing results from the sensors 22 to 26 and the control states of the electronic control units 27 at a step S11. Then, the state analyzing section 45 determines at a step S12 whether any of the states of the various portions of the vehicle is bad, or whether the LAN 21 is busy for the various portions of the vehicle. For example, the state analyzing section 45 detects the speed and acceleration of the vehicle, the temperature in the vehicle, the roughness of the road, the engine rotation frequency of the engine, and the voltage of the battery. That is, the state analyzing section 45 determines that the vehicle state is bad or the LAN 21 is busy when the speed of the vehicle changes largely during a high speed running. Also, the state analyzing section 45 determines that the vehicle state is bad or the LAN 21 is busy when the acceleration of the vehicle is out of a predetermined range, i.e., when the acceleration of the vehicle is large. Also, the state analyzing section 45 determines that the vehicle state is bad or the LAN 21 is busy when the temperature in the vehicle is out of a predetermined range, i.e., in a hot or cold range. Moreover, the state analyzing section 45 determines that the vehicle state is bad or the LAN 21 is busy when the roughness of the road is out of a predetermined range. Also, the state analyzing section 45 determines that the vehicle state is bad or the LAN 21 is busy when the rotation frequency of the engine in the vehicle is out of a predetermined range, i.e., in a lower or higher rotation frequency range. In addition, the state analyzing section 45 determines that the vehicle state is bad or the LAN 21 is busy when the battery voltage in the vehicle is out of a predetermined range, i.e., in a lower or higher voltage range.

When the state analyzing section 46 determines that the any of the detected states is bad or the LAN 21 is busy (Yes at the step S12), the state analyzing section 46 sets the flag for each of the navigation programs and data to nonpermission. The state analyzing section 46 reset the flag when the state of the portion of the vehicle is restored. Thus, the state analyzing section 46 controls the install module 43 to carry out or stop or interrupt the installation of the updated navigation software set based on the flags at a step S13. Thus, the installation is stopped or interrupt. Then, the install module 43 starts or restarts the installation of the software set at a step S14. When the state analyzing section 46 determines that the LAN 21 is not busy (No at the step S12), the step S14 is carried out. That is, the install module 43 continues the installation of the updated navigation software set while the main unit 11 controls the electronic control units of the vehicle. It should be noted that the vehicle navigation using the DVD-ROM is carried out during the installation.

According to the navigation system according to the first embodiment, the installation of the updated navigation software set can be carried out fast in consideration of the states of the main unit.

Next, the operation of the navigation system according to the second embodiment of the present invention will be described with reference to FIG. 6. The structure of the navigation system in the second embodiment is the same as that of the first embodiment.

In the second embodiment, a flag (not shown) is allocated to each of the navigation programs and data of the navigation software set. The flag indicates a specific program or data that is executed or used more primarily than installation of the navigation program or data during the vehicle navigation. The flag is previously set on the manufacturing based on the content of the program or data.

Figure 6:
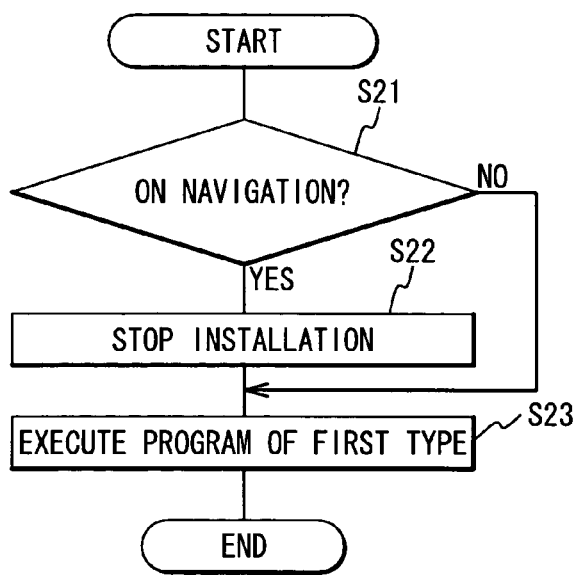
FIG. 6 is a flowchart showing the detail of the navigation system update procedure in the navigation system according to a second embodiment of the present invention.

The flow shown in FIG. 6 is executed during the above step S3. More particularly, the install module 43 checks at a step S21 whether the vehicle navigation is currently being carried out. When it is determined at the step S21 that the vehicle navigation is currently being carried out, the install module 43 checks at a step S22 whether the navigation program to be executed automatically or instructed to be executed by the user is of a second type, i.e., whether the flag indicates the program is the specific program or data. If the flag indicates that the program is the specific program or data, the install module 43 stops the installation of the navigation programs or data at a step S22. Then, the install module 43 executes the program of the second type at a step S23. When it is determined at the step S21 that the vehicle navigation is currently not being carried out, the control advances directly to the step S23 to execute the program of the second type at a step S23.

According to the navigation system according to the second embodiment, the installation of the updated navigation software set can be carried out fast without the necessary execution of the program of the second type.

Figure 7:
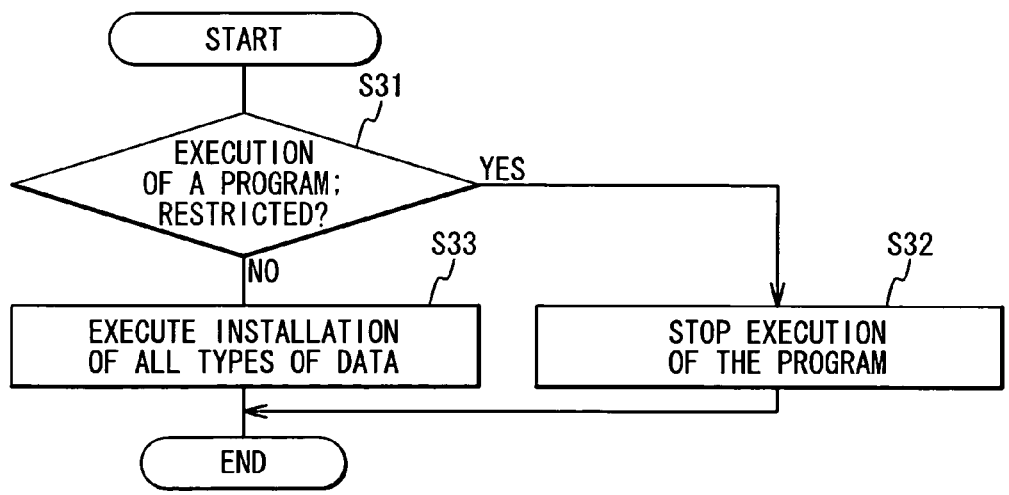
FIG. 7 is a flowchart showing the detail of the navigation system update procedure in the navigation system according to a third embodiment of the present invention.

Next, the operation of the navigation system according to the third embodiment of the present invention will be described with reference to FIG. 7. The structure of the navigation system in the second embodiment is the same as that of the first embodiment.

In the third embodiment, a flag (not shown) is allocated to each of the navigation programs and data of the navigation software set. The flag indicates primary installation of the navigation program or data. The flag is previously set by the user.

The flow shown in FIG. 6 is executed during the above step S3. More particularly, when user instructs the installation of the updated navigation software set, the install module 43 reads out names of the navigation programs and data and outputs to the output unit 16 through the output management module 44. The user selects the navigation programs or data to be installed using the input unit 17. The input analyzing section 45 sets primary installation to each of the flags based on the inputs by the user.

When a specific one of the navigation programs is to be executed automatically or instructed by the user to be executed, the install module 43 checks at a step S31 the flag of each of the navigation programs and data in response to an installation instruction from the user through the input unit 17. If the flag indicates the primary installation, the install module 43 carries out the installation of the navigation programs or data with the flag of the primary installation and stops the execution of the specific program at a step S32. On the other hand, if the flag does not indicate the primary installation, the install module 43 stops or interrupts the installation of the navigation programs or data without the flag of the primary installation and executes the specific program at a step S33. Thus, the user can select some of all the navigation programs and data of the navigation software set.

According to the navigation system according to the third embodiment, the installation of the updated navigation software set can be carried out fast based on the user intension.

Although various embodiments are shown, these can be applied in combination in a scope without contradiction.

Although the invention has been described in its preferred form with a certain degree of particularity, it is understood that the present disclosure of the preferred form has been changed in the details of construction and the combination and arrangement of parts may be resorted to without departing from the scope of the invention as hereinafter claimed.

What is claimed is:

1. A vehicle navigation system comprising:
   a hard disk drive, in which an old navigation software set is stored;
   an optical disk drive which is accessible to an optical disk which stores a new navigation software set;
   a first executing section which drives said hard disk drive;
   a second executing section which drives said optical disk drive; and
   an install section responsive to a navigation instruction to control said first executing section to drive said hard disk drive such that a vehicle navigation is carried out based on said old navigation software set, when said optical disk is not available, and to control said second executing section to drive said optical disk drive such that the vehicle navigation is carried out based on said new navigation software set and said first and second executing sections to drive said hard disk drive and said optical disk drive such that said new navigation software set is installed from said optical disk into said hard disk drive, when said optical disk is available,
   wherein said install section controls said first and second executing sections to stop the installation of said new navigation software set, when a predetermined vehicle state is detected.

2. The vehicle navigation system according to claim 1, wherein on completion of the installation, said install section automatically controls said second executing section to stop the operation and said first executing section to drive said hard disk drive such that the vehicle navigation is carried out based on said new navigation software set stored in said hard disk drive.

3. The vehicle navigation system according to claim 1, further comprising:
   an output unit; and
   an output control unit which controls said output unit, wherein said install section calculates a data size transferred from said optical disk drive to said hard disk drive, and controls said output control unit such that said output unit outputs the data size.

4. The vehicle navigation system according to claim 3, wherein said install section calculates a remaining time for the installation in addition to the data size, and controls said output control unit such that said output unit outputs the remaining time in addition to the data size.

5. The vehicle navigation system according to claim 1, further comprising:
   a plurality of sensors which sense states of said vehicle; and
   a state analyzing section which analyzes the sensed states of said vehicle and determines whether said vehicle is in the predetermined vehicle state.

6. The vehicle navigation system according to claim 5, wherein said plurality of sensors are sensors for at least two of a speed and acceleration of said vehicle, a temperature in said vehicle, a battery voltage of said vehicle and a tachometer.

7. A vehicle navigation system comprising:
   a hard disk drive, in which an old navigation software set is stored;
   an optical disk drive which is accessible to an optical disk which stores a new navigation software set;
   a first executing section which drives said hard disk drive;
   a second executing section which drives said optical disk drive; and
   an install section responsive to a navigation instruction to control said first executing section to drive said hard disk drive such that a vehicle navigation is carried out based on said old navigation software set, when said optical disk is not available, and to control said second executing section to drive said optical disk drive such that the vehicle navigation is carried out based on said new navigation software set and said first and second executing sections to drive said hard disk drive and said optical disk drive such that said new navigation software set is installed from said optical disk into said hard disk drive, when said optical disk is available,
   wherein said new navigation software set contains navigation programs and data, and each of said navigation programs is designated to be specific or not, and
   said install section controls said first and second executing sections to stop the installation of each of said navigation programs and data, when one of said navigation program to be executed is specific, and to carry out the installation of each of said navigation programs and data, when said one navigation program is not specific.

8. The vehicle navigation system according to claim 7, wherein on completion of the installation, said install section automatically controls said second executing section to stop the operation and said first executing section to drive said hard disk drive such that the vehicle navigation is carried out based on said new navigation software set stored in said hard disk drive.

9. The vehicle navigation system according to claim 7, further comprising:
   an output unit; and
   an output control unit which controls said output unit,
   wherein said install section calculates a data size transferred from said optical disk drive to said hard disk drive, and controls said output control unit such that said output unit outputs the data size.

10. The vehicle navigation system according to claim 9, wherein said install section calculates a remaining time for the installation in addition to the data size, and controls said output control unit such that said output unit outputs the remaining time in addition to the data size.

11. A vehicle navigation system comprising:
    a hard disk drive, in which an old navigation software set is stored;
    an optical disk drive which is accessible to an optical disk which stores a new navigation software set;
    a first executing section which drives said hard disk drive;
    a second executing section which drives said optical disk drive; and
    an install section responsive to a navigation instruction to control said first executing section to drive said hard disk drive such that a vehicle navigation is carried out based on said old navigation software set, when said optical disk is not available, and to control said second executing section to drive said optical disk drive such that the vehicle navigation is carried out based on said new navigation software set and said first and second executing sections to drive said hard disk drive and said optical disk drive such that said new navigation software set is installed from said optical disk into said hard disk drive, when said optical disk is available,
    wherein said new navigation software set contains navigation programs and data, and each of said navigation programs is designated to be restricted or not, and
    said install section controls said first and second executing sections to carry out the installation of each of said navigation programs and data without executing a restricted one of the navigation programs when the restricted navigation program is to be executed during the vehicle navigation.

12. The vehicle navigation system according to claim 11, further comprising:
    an input analyzing section which designates whether each of said navigation programs is restricted, based on an input from a user.

13. The vehicle navigation system according to claim 11, wherein on completion of the installation, said install section automatically controls said second executing section to stop the operation and said first executing section to drive said hard disk drive such that the vehicle navigation is carried out based on said new navigation software set stored in said hard disk drive.

14. The vehicle navigation system according to claim 11, further comprising:
    an output unit; and
    an output control unit which controls said output unit,
    wherein said install section calculates a data size transferred from said optical disk to said hard disk drive, and controls said output control unit such that said output unit outputs the data size.

15. The vehicle navigation system according to claim 14, wherein said install section calculates a remaining time for the installation in addition to the data size, and controls said output control unit such that said output unit outputs the remaining time in addition to the data size.

16. A method for upgrading a vehicle navigation system including an optical disk drive which stores a new navigation software set and a hard disk drive which stores an old navigation software set, said method comprising:
    (a) determining whether an optical disk is available in response to an installation instruction;
    (b) carrying out a vehicle navigation based on said old navigation software set, when said optical disk drive is not available; and (c) installing said new navigation software set from said optical disk drive into said hard disk drive while carrying out said vehicle navigation based on said new navigation software set, when said optical disk drive is available, wherein said method further comprises:

determining whether a vehicle is in a predetermined vehicle state; and stopping said installation of said new navigation software set, when said vehicle is determined to be in the predetermined vehicle state.

17. The method according to claim 16, further comprising:

automatically switching such that said vehicle navigation is carried out based on said installed new navigation software set on completion of said installation.

18. The method according to claim 16, further comprising:

calculating a data size transferred from said optical disk drive to said hard disk drive; and displaying said data size.

19. The method according to claim 18, further comprising:

calculating a remaining time for said installation in addition to the data size; and displaying said remaining time in addition to said data size.

20. The method according to claim 16, further comprising:

sensing states of said vehicle; and determining whether said vehicle is in the predetermined vehicle state, based on the sensed results.

21. The method according to claim 20, wherein at least two of a speed and acceleration of said vehicle, a temperature in said vehicle, a battery voltage of said vehicle and a tachometer are sensed.

22. A method for upgrading a vehicle navigation system including an optical disk drive which stores a new navigation software set and a hard disk drive which stores an old navigation software set, said method comprising:

(a) determining whether an optical disk is available in response to an installation instruction;

(b) carrying out a vehicle navigation based on said old navigation software set, when said optical disk drive is not available; and (c) installing said new navigation software set from said optical disk drive into said hard disk drive while carrying out said vehicle navigation based on said new navigation software set, when said optical disk drive is available, wherein said new navigation software set contains navigation programs and data, and each of said navigation programs is designated to be specific or not, and said method further comprises:

stopping the installation of each of said navigation programs and data, when one of said navigation programs to be executed is specific; and carrying out the installation of each of said navigation programs and data, when said one navigation program is not specific.

23. A method for upgrading a vehicle navigation system including an optical disk drive which stores a new navigation software set and a hard disk drive which stores an old navigation software set, said method comprising:

(a) determining whether an optical disk is available in response to an installation instruction;

(b) carrying out a vehicle navigation based on said old navigation software set, when said optical disk drive is not available; and (c) installing said new navigation software set from said optical disk drive into said hard disk drive while carrying out said vehicle navigation based on said new navigation software set, when said optical disk drive is available, wherein said new navigation software set contains navigation programs and data, and each of said navigation programs is designated to be restricted or not, and said method further comprises:

carrying out the installation of each of said navigation programs and data without executing a restricted one of the navigation programs when the restricted navigation program is to be executed during the vehicle navigation.

24. The method according to claim 23, further comprising:

designating whether each of said navigation programs is restricted, based on an input from a user.

25. A computer-readable software product for a method for upgrading a vehicle navigation system including an optical disk drive which stores a new navigation software set and a hard disk drive which stores an old navigation software set, said method comprising:

(a) determining whether an optical disk is available in response to an installation instruction;

(b) carrying out a vehicle navigation based on said old navigation software set, when said optical disk drive is not available;

(c) installing said new navigation software set from said optical disk drive into said hard disk drive while carrying out said vehicle navigation based on said new navigation software set, when said optical disk drive is available, wherein said method further comprises:

determining whether a vehicle is in a predetermined vehicle state; and stopping said installation of said new navigation software set, when said vehicle is determined to be in the predetermined vehicle state.

26. The computer-readable software product according to claim 25, wherein said method further comprises:

automatically switching such that said vehicle navigation is carried out based on said installed new navigation software set on completion of said installation.

27. The computer-readable software product according to claim 25, wherein said method further comprises:

calculating a data size transferred from said optical disk drive to said hard disk drive; and displaying said data size.

28. The computer-readable software product according to claim 27, wherein said method further comprises:

calculating a remaining time for said installation in addition to the data size; and displaying said remaining time in addition to said data size.

29. The computer-readable software product according to claim 25, wherein said method further comprises:

sensing states of said vehicle; and determining said vehicle is in the predetermined vehicle state, based on the sensed results.

30. The computer-readable software product according to claim 29, wherein at least two of a speed and acceleration of said vehicle, a temperature in said vehicle, a battery voltage of said vehicle and a tachometer are sensed.

31. A computer-readable software product for a method for upgrading a vehicle navigation system including an optical disk drive which stores a new navigation software set and a hard disk drive which stores an old navigation software set, said method comprising:
- (a) determining whether an optical disk is available in response to an installation instruction;
- (b) carrying out a vehicle navigation based on said old navigation software set, when said optical disk drive is not available;
- (c) installing said new navigation software set from said optical disk drive into said hard disk drive while carrying out said vehicle navigation based on said new navigation software set, when said optical disk drive is available, wherein said new navigation software set contains navigation programs and data, and each of said navigation programs is designated to be specific or not, and said method further comprises:

stopping the installation of each of said navigation programs and data, when one of said navigation programs to be executed is specific; and carrying out the installation of each of said navigation programs and data, when said one navigation program is not specific.

32. A computer-readable software product for a method for upgrading a vehicle navigation system including an optical disk drive which stores a new navigation software set and a hard disk drive which stores an old navigation software set, said method comprising:
- (a) determining whether an optical disk is available in response to an installation instruction;
- (b) carrying out a vehicle navigation based on said old navigation software set, when said optical disk drive is not available;
- (c) installing said new navigation software set from said optical disk drive into said hard disk drive while carrying out said vehicle navigation based on said new navigation software set, when said optical disk drive is available, wherein said new navigation software set contains navigation programs and data, and each of said navigation programs is designated to be restricted or not, and said method further comprises:

stopping said installation of each of said navigation programs and data of said new navigation software set based on a specification when said vehicle navigation is carried out; and carrying out the installation of each of said navigation programs and data without executing a restricted one of the navigation programs when the restricted navigation program is to be executed during the vehicle navigation.

33. The computer-readable software product according to claim 32, wherein said method further comprises:

designating whether each of said navigation programs is restricted, based on an input from a user.

* * * * *